United States Patent
Ohba et al.

(10) Patent No.: US 6,334,022 B1
(45) Date of Patent: Dec. 25, 2001

(54) VIDEO INFORMATION RECORDING AND REPRODUCING APPARATUS

(75) Inventors: Akihiko Ohba, Tokyo; Toru Matsushita, Kokubunji; Masahiro Kageyama, Hachioji; Hiroshi Yoshigi, Tokyo; Taizo Kinoshita, Tachikawa; Tatsundo Suzuki, Musashimurayama; Yukio Kumagai, Tokorozawa; Hisao Tanabe, Hachioji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/030,761

(22) Filed: Feb. 26, 1998

(30) Foreign Application Priority Data

Feb. 27, 1997 (JP) .................................................. 9-043293

(51) Int. Cl.$^7$ ...................................................... H04N 5/91
(52) U.S. Cl. ............................. 386/46; 386/125; 360/72.1
(58) Field of Search ........................... 386/68–70, 45–46, 386/83, 125–126, 109, 52; 360/72.1, 72.2, 72.3; 725/9, 21, 46, 58, 48, 53

(56) References Cited

U.S. PATENT DOCUMENTS

| | | | | |
|---|---|---|---|---|
| 4,685,003 | * | 8/1987 | Westland | 386/52 |
| 5,636,314 | * | 6/1997 | Murayama | 386/46 |
| 5,719,985 | * | 2/1998 | Ito et al. | 386/109 |
| 5,729,648 | * | 3/1998 | Boyce et al. | 386/69 |
| 5,734,444 | * | 3/1998 | Yoshinobu | 725/58 |
| 5,905,842 | * | 5/1999 | Kajimoto | 386/52 |
| 6,031,963 | * | 2/2000 | Kitamura et al. | 386/109 |
| 6,072,934 | * | 6/2000 | Abecassis | 386/46 |

* cited by examiner

*Primary Examiner*—Thai Tran
*Assistant Examiner*—Christopher Onuaku

(57) ABSTRACT

The video information recording and reproducing apparatus includes an inputting information part for receiving video information, a storing information part, an outputting information part for producing video information, an automatic indexing information part for automatically adding indexes to the inputted video information, a filtering video information part for automatically selecting video information to be stored from the inputting information part, and a controlling part for controlling the above elements, thereby actualizing the free time-shift viewing function, intelligent search function, and automatic video data base generation function.

16 Claims, 6 Drawing Sheets

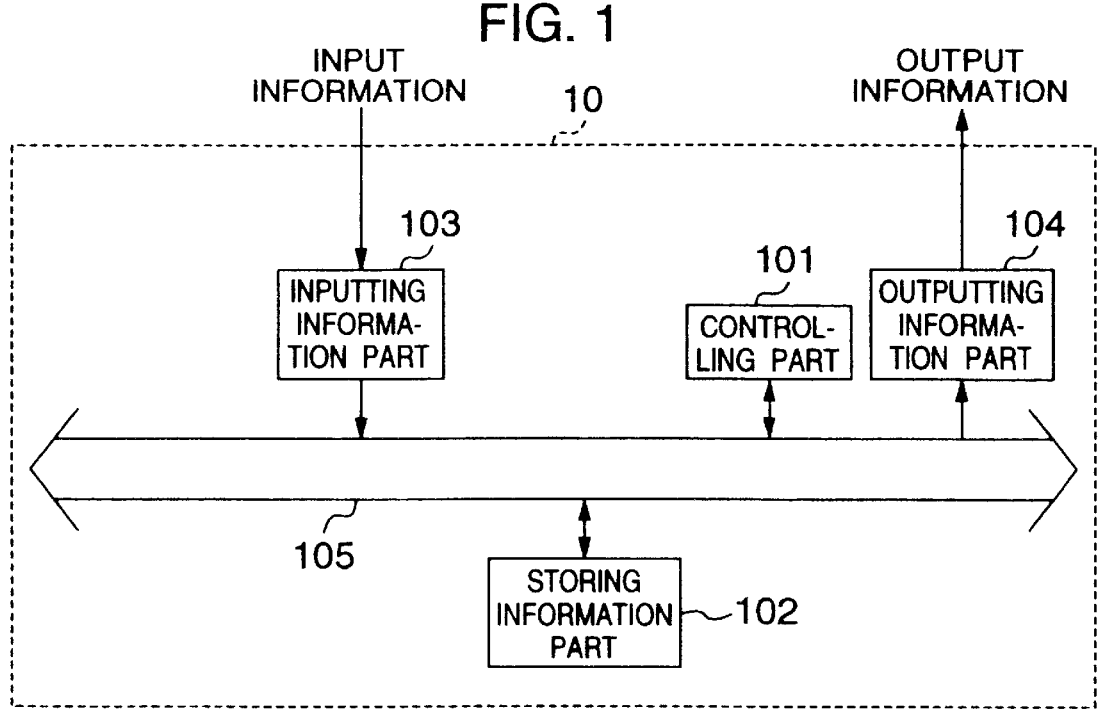
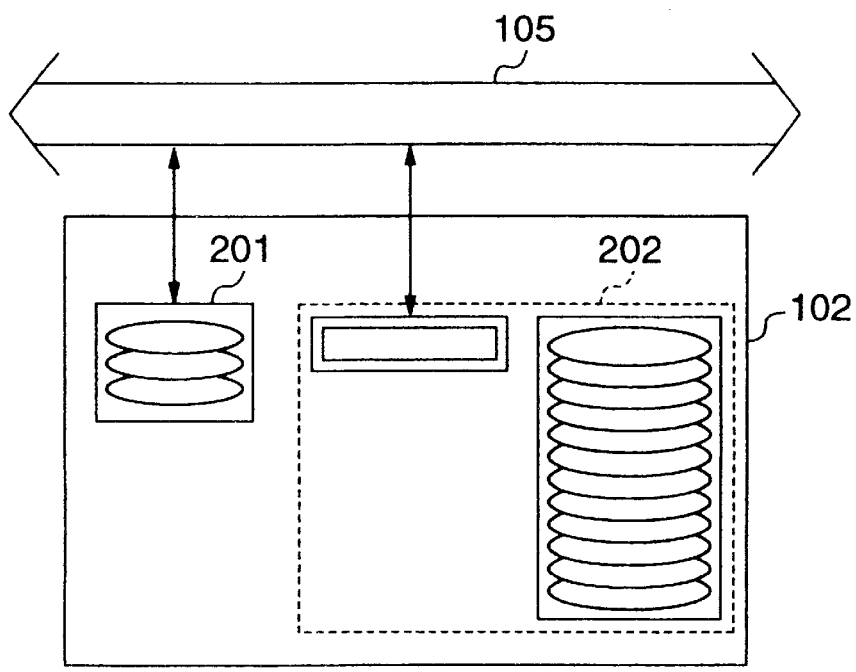

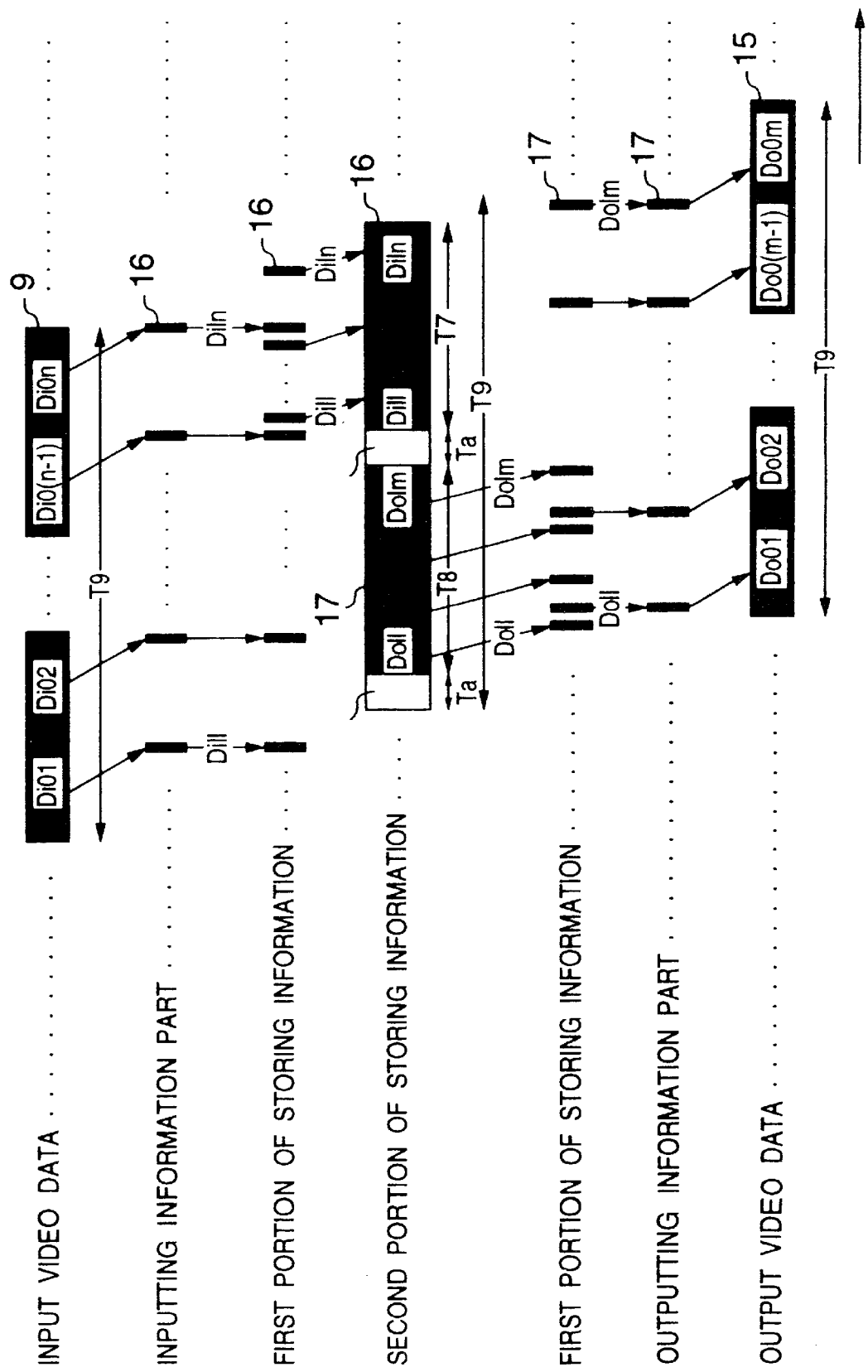

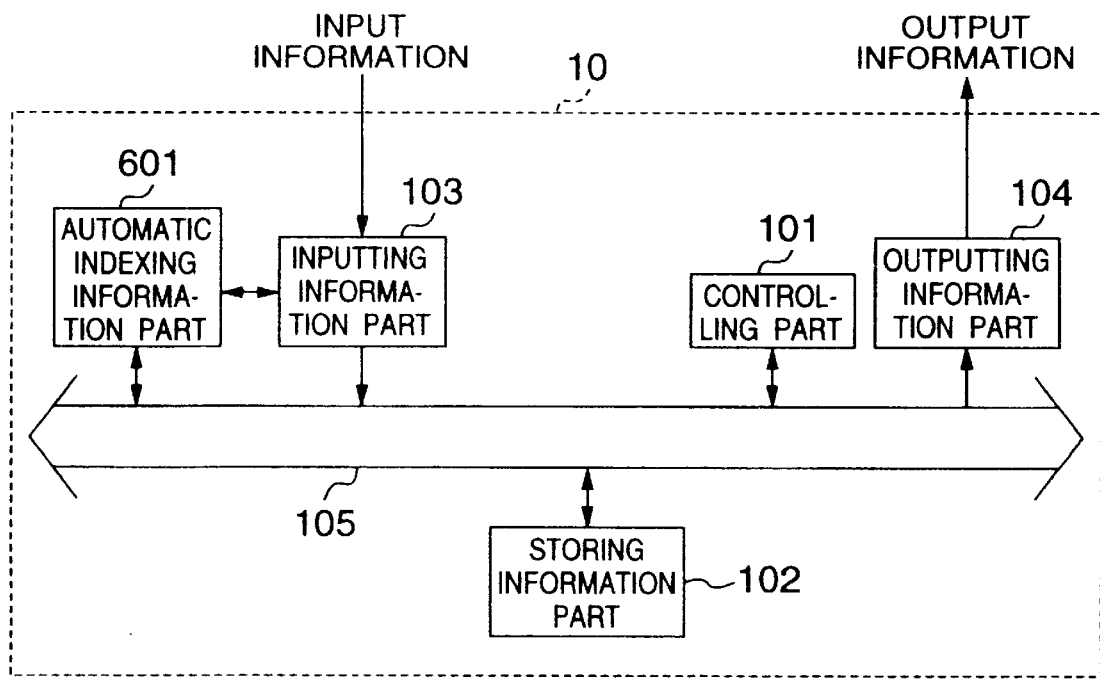
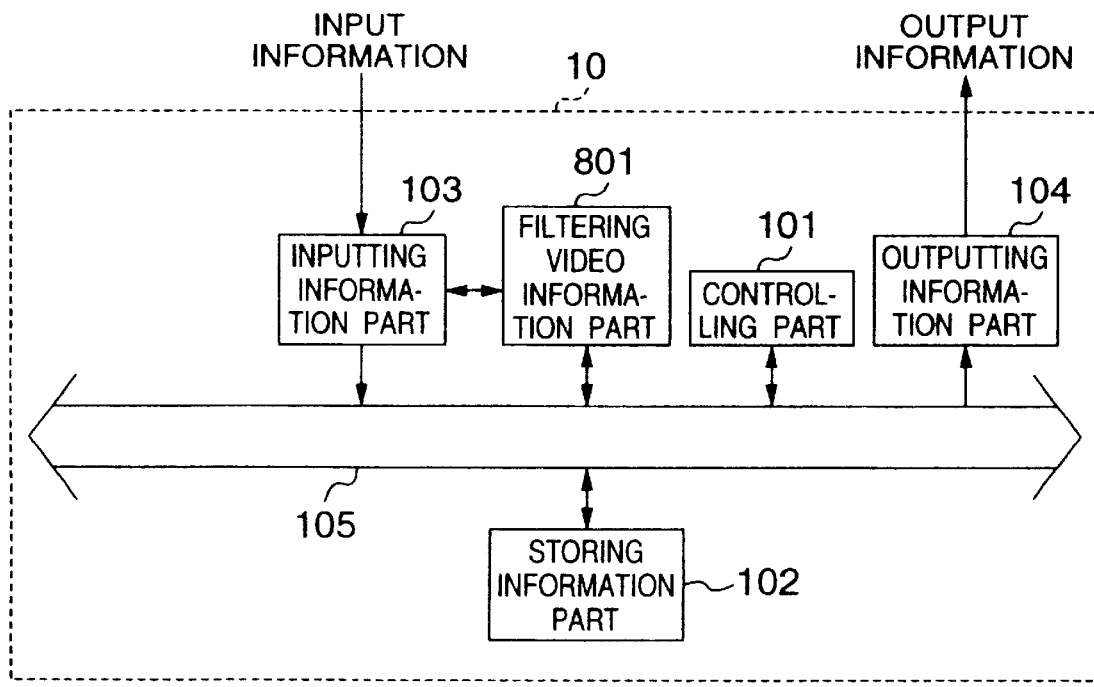

LIST OF SCENE CHANGE CUTS

TIMETABLE - TYPE LIST OF CUTS

VIDEO INFORMATION RECORDING AND REPRODUCING APPARATUS

BACKGROUND OF THE INVENTION

The present invention relates to a video information recording and reproducing apparatus for recording and reproducing chiefly video information.

In recent years, disk drives respectively using optical disk and magnetic disks have been developed to have a larger capacity of storage and operate at higher speed, and image compression technology has also been remarkably advanced. A magnetooptical disk drive using a 130 mm diameter disk of which the one-side storage capacity is 1 GB or more, and a magnetic disk drive using 90-mm diameter disks of several GBs per disk, are practically used. In addition, a first-generation rewritable digital video disk (hereinafter, abbreviated DVD-RAM) will be produced in the near future, which is able to record information of 2.6 GB on one side of a phase change optical disk with a diameter of 120 mm. These optical-disk and magnetic-disk drives are capable of transferring data at a high rate of several tens of Mbps.

As to the image compression technology, MPEG (Moving Picture Experts Group) is established as an international standard for moving picture compression. In MPEG 1 substantially equivalent to the picture quality of VHS of VTR, the data transfer rate is 1.5 Mbps, and a capacity of about 600 MB will be needed to store moving pictures of 60 minutes. In MPEG 2, a data transfer rate of about 4 to 6 Mbps is necessary to achieve the picture quality of the present TV received picture quality or above, and the capacity for moving pictures of 60 minutes is about 1.8 to 2.7 GB. Thus, with the development of the above disk drives using optical and magnetic disks and the advancement of the image compression technology, it has become possible for the moving picture information which needs a high capacity of storage and a high rate of data transfer to be treated by the disk drives. Consequently, the industry is now seriously considering the application of these disk drives not only to a large-scale video server but also to a home video recording and reproducing apparatus.

There is now a video tape recorder (hereinafter, abbreviated VTR) as the home video recording and reproducing apparatus, which is now very popular. The conventional apparatus has a function of recording and reproducing one-channel video, and a search function such as programmed recording function. Since VTR uses a tape, or a sequential memory as a recording medium, it can record one program or reproduce one recorded program at the same time. The programmed recording function is to record a desired program by previously inputting the channel number, start time and end time into the VTR from a remote controller which the user handles. The VISS as the present search function of the VTR is to find the beginning of a recorded program on the basis of an index signal recorded on the tape at the time of starting to record.

Japanese Patent Laid-open Gazette 5-303873 describes that an arbitrarily recorded image portion can be reproduced in real time from a plurality of random-accessible image recorded portions without interrupting the recording.

However, use of only the above function to find the beginning cannot realize true free time-shift viewing.

In the gazette, when the user tries to view a recorded program at an arbitrary time under the condition that a certain program is being recorded on the VTR (for example, programmed recording), it is necessary to stop the recording operation or wait until it ends. In other words, the present VTR cannot realize free time-shift viewing in which the user can view a desired program at an arbitrary time.

In addition, the programmed recording operation in the gazette requires the user to input channel number, starting time, and end time into the VTR as describe above, and is thus very troublesome. Recently, a simplified programmed recording function such as G code is used, but it is not basically improved in its operation. Thus, the programmed recording function of the VTR cannot be widely used.

Moreover, since the VISS as the search function of the VTR is to only find the beginning as described above, the user cannot instantly know the contents of the recording on the tape, and thus must search the programs by finding the beginning of each program. Therefore, since it takes a much longer time to search a plurality of tapes, this search function is not practical.

SUMMARY OF THE INVENTION

It is an object of the invention to provide a video information recording and reproducing apparatus on which the user can view a desired recorded program at any time, readily search for a desired program, and automatically store a desired program.

According to the invention, in order to achieve the above object, there is provided a video information recording and reproducing apparatus having an inputting information part formed of interfaces for receiving chiefly video information, a storing information part, an outputting information part formed of interfaces for producing chiefly video information, and a controlling part for controlling the apparatus, so that the controlling part can order to cause a plurality of video information from the inputting information part to be stored in the storing information part in a time-sharing manner, or arbitrarily ones of a plurality of video information stored in the storing information part to be produced from the outputting information part in real time, or one or more video information from the inputting information part to be stored in the storing information part and at the same time arbitrary ones of the video information stored in the storing information part to be produced from the outputting information part in real time.

In addition, according to the invention, an automatic indexing information part for automatically adding indexes to the inputted video information is provided in the above video information recording and reproducing apparatus.

Moreover, according to the invention, a filtering video information part for automatically selecting video information to be stored from the inputting information part is provided in the above video information recording and reproducing apparatus.

By using the video information recording and reproducing apparatus of the invention, which is capable of recording and reproducing a plurality of video information in and from the storing information part in a time-sharing manner, automatically adding indexes to the video information by the automatic indexing information part, and automatically selecting video information by the filtering video information part, it is possible to provide a video filing apparatus having a free time-shift viewing function, an intelligent search function by simple operation, and an automatic video data base generation function to automatically store video information.

BRIEF DESCRIPTION OF THE DRAWINGS

FIG. 1 is an apparatus block diagram of one embodiment of the invention.

FIG. 2 is a block diagram of a storing information part according to the invention.

FIG. 5 is a timing chart for a plurality of video information processed in a time sharing manner.

FIG. 6 is an apparatus block diagram of another embodiment of the invention.

FIG. 8 is an apparatus block diagram of another embodiment of the invention.

DESCRIPTION OF THE PREFERRED EMBODIMENTS

Figure 3:
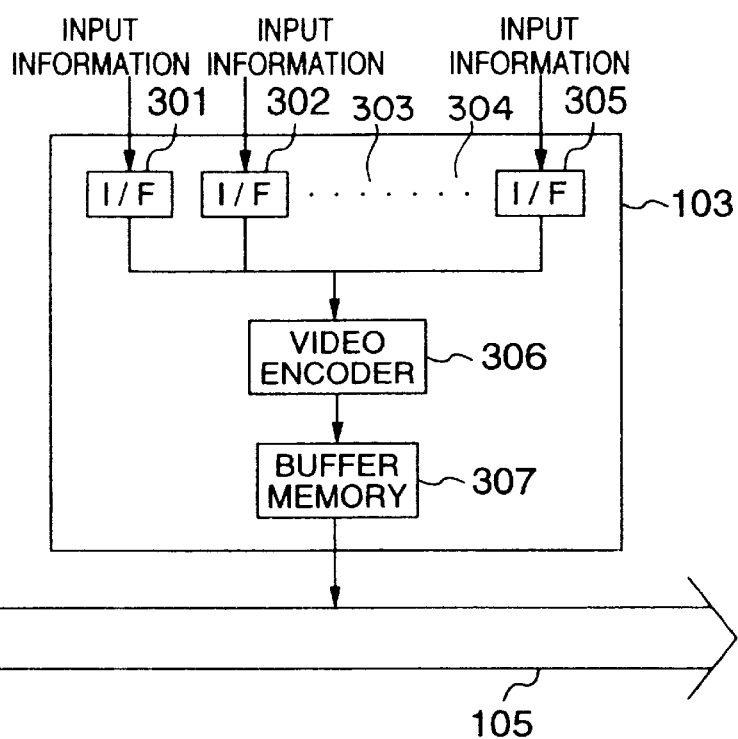
FIG. 3 is a block diagram of an inputting information part according to the invention.

Embodiments of the invention will be described with reference to the drawings.

FIG. 1 is an apparatus block diagram of a video information recording and reproducing apparatus 10 of one embodiment of the invention. Referring to FIG. 1, there are shown a controlling part 101 for controlling the whole apparatus, a storing information part 102, an inputting information part 103 for chiefly inputting video information, an outputting information part 104 for chiefly outputting video information, and a data bus 105 through which video information and control information are transferred.

The controlling part 101 is formed of a microcomputer, a memory and so on. The controlling part 101 controls the whole apparatus such as analyzing a command from the user, starting and stopping the inputting information part 103, the outputting information part 104 and the storing information part 102, and controlling data to be transferred through the bus 105. The storing information part 102 is formed of one or more portions of storing information, and records and reproduces information of chiefly video information, which is inputted in and outputted from the video information recording and reproducing apparatus of the invention, and other information such as search information and control information. The inputting information part 103 is formed of one or more interfaces for terrestrial TV broadcasting, satellite TV broadcasting, cable TV and communication channel, and a video encoder including an A/D converter and a memory. The inputting information part 103 switches information input sources, and converts data including a process such as compressing input information. The outputting information part 104 is formed of one or more of interfaces for analog video, digital video, analog audio, digital audio, and communication channel and a general-purpose interface such as SCSI, and a video decoder including a D/A converter and a memory. The outputting information part 104 makes data conversion including expansion of data, and outputs information. The data bus 105 is used to transfer control data from the controlling part 101, video information and search information. The data transfer rate of the data bus 105 is required to be larger than the total sum of transfer rates at which video information is recorded and reproduced at the same time, and the data transfer rate in the storing information part 102. This apparatus construction shown in FIG. 1 is capable of free time-shift viewing in which the user can view a desirably recorded program at any time.

The storing information part 102 according to the invention will be described in detail with reference to FIG. 2. The storing information part 102 is formed of two different first and second portions of storing information 201, 202. The effective data transfer rate of the first portion of storing information 201 is faster than that of the second portion of storing information 202, and the storage capacity of the first portion of storing information 201 is smaller than that of the second portion of storing information 202. The second portion of storing information 202 is a reading and writing apparatus with an automatic disk changer using hand-portable media. Usually, the second portion of storing information 202 is lower in bit cost than the first portion of storing information 201. Therefore, the two portions of storing information are combined so that the first portion of storing information 201 is used for the process which needs higher speed and the second portion of storing information 202 is used for the process which requires large storage capacity, thus making it possible to realize the storing information part 102 of low cost. Specifically, in this invention, the second portion of storing information 202 stores raw material information such as video information, and the first portion of storing information 201 stores management information for the second portion of storing information 202 or search information for the stored information in the second portion of storing information 202. Thus, the search information can be displayed swiftly, and make high-speed searching. Also, according to the invention, the first portion of storing information 201 is used as a cache to the second portion of storing information 202. This portion that all information to be inputted to and outputted from the second portion of storing information 202 is once stored in the first portion of storing information 201. Thus, the storing information part 102 can be used as a high-speed storage device. This can reduce the cost of the apparatus since the number of buffers for data transfer can be decreased. According to the invention, the storing information part 102 makes use of the features of the two portions of storing information as described above. Specifically, according to the invention, the first portion of storing information 201 is a magnetic hard disk unit, and the second portion of storing information 202 is a reading and writing apparatus with an automatic disk changer using phase-change type optical disks such as digital video disks (hereinafter, abbreviated DVD) or magnetooptical disks. However, if the above conditions are satisfied, other portions than the combination of two portions of storing information may be used.

The inputting information part 103 will be described in detail with reference to FIG. 3. The inputting information part 103 of the invention includes one or more of a satellite TV broadcasting interface 301, a terrestrial TV broadcasting interface 302, a cable TV interface 303, a communication channel interface 304 for Internet and telephone circuits, and a digital general-purpose interface 305 such as SCSI, ATA, IEEE 1394 and optical fiber channel, a video encoder 306 including an A/D converter and a memory, and if necessary, a buffer memory 307 for data transfer. Each broadcasting interface listed above includes a tuner by which a channel is selected in the order from the controlling part 101. After the channel selection, it is followed by, if necessary, demodulation process, error correction decoding process, descramble process, and demultiplex process. The above processes are the same as in each broadcasting receiver, and thus will not be described in detail. The communication channel interface 304 and digital general-purpose interface 305 are followed by, if necessary, a predetermined protocol process, and a demodulation process. These processes are also the same as in the usual case, and thus will not be described in detail. The input video information is transferred from each interface to the video encoder 306, where when the input video information is analog, it is converted by A/D converter 306 into digital information. The digital information is then, if necessary, compressed, and transferred through the data bus 105 to the storing information part 102 and so on.

Figure 4:
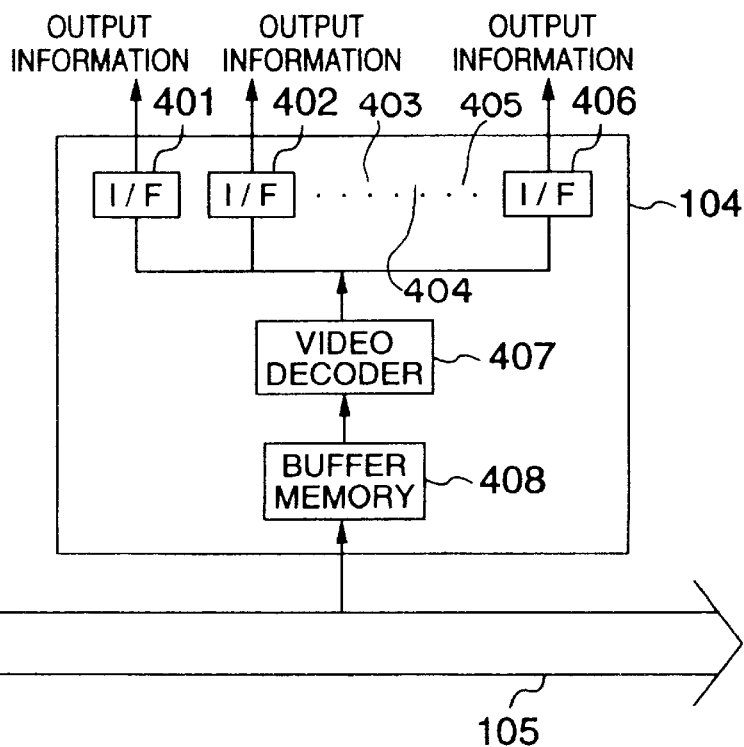
FIG. 4 is a block diagram of an outputting information part according to the invention.

The outputting information part 104 will be described in detail with reference to FIG. 4. The outputting information part 104 according to the invention has one or more of a video analog interface 401, a video digital interface 402, an audio analog interface 403, an audio digital interface 404, a general-purpose interface 405 such as SCSI, ATA, IEEE 1394 and optical fiber channel, and a communication channel interface 406 for Internet and telephone circuits, a video decoder 407 including a D/A converter and a memory, and if necessary, a buffer memory 408 for data transfer. The video information transferred to the outputting information part 104 is supplied to the video decoder 407, where when the input video information is already compressed, it is expanded. When the input video information is not compressed, it is of course not expanded. Then, when the output information is digital, it is converted from digital to analog form, and fed to each interface where modulation process and protocol process, if necessary, are performed. Thus, the processed information is outputted from the outputting information part 104.

With reference to FIG. 5, a description will be made of the conditions and method for recording and reproducing a plurality of video information in and from the storing information part 102 by a time-sharing process in the apparatus shown in FIG. 1, that is, of a method of realizing the free time-shift viewing in the apparatus.

FIG. 5 shows flow of video data with respect to time. The arrows in the illustration indicate the flow of data. Di01, Di02, . . . , Di0n indicate a sequence of video data to be inputted to this apparatus, that is, n data blocks are shown. Do01, Do02, . . . , Do0m are a sequence of video data produced from this apparatus, or m data blocks are shown. Di11, Di12, . . . , Di1n represent data blocks into which the data blocks Di01, Di02, . . . , Di0n are converted in the inputting information part 103. Do11, Do12, . . . , Do1m are data blocks read from the storing information part 102 and which are converted into Do01, Do02, . . . , Do0m in the outputting information part 104. T7 represents the recording time period in the second portion of storing information 202, T8 the reproducing time period in the second portion of storing information 202, T9 the period of the recording and reproducing operations in the second portion of storing information 202, and Ta the access time to the second portion of storing information 202.

The recording operation will be mentioned. Video data 9 inputted during the time T9 to this apparatus is converted from an analog to digital form and compressed in the inputting information part 103, and produced as video data 16 from the inputting information part 103. The video data 16 produced from the inputting information part 103 is written in the first portion of storing information 201 the instant it is produced from the inputting information part 103. The operation of writing the video data 16 in the first portion of storing information 201 is steadily performed at substantially constant intervals of time as illustrated. The video data 16 written in the first portion of storing information 201 is transferred from the first portion of storing information 201 to the second portion of storing information 202. The operation of reading the video data 16 from the first portion of storing information 201 is performed by reading the plurality of data blocks Di11, Di12, . . . , Di1n during the time interval of Ta+T7 as illustrated. The video data 16 transferred to the second portion of storing information 202 is recorded in the second portion of storing information 202 during the time T7.

The reproducing operation will be described below. The video data 17 read from the second portion of storing information during the reproducing time T8 is transferred to the first portion of storing information 201, and written in the first portion of storing information 201. The operation of writing the video data 17 in the first portion of storing information 201 is performed by writing a plurality of data blocks during the time of Ta+T8. The video data 17 written in the first portion of storing information 201 is read from the first portion of storing information 201, and transferred to the outputting information part 104. The operation of reading the video data 17 from the first portion of storing information 201 is steadily performed at substantially constant intervals of time as illustrated. The video data 17 is expanded and converted from a digital to analog form in the outputting information part 104, and produced therefrom as video data 15 of time period T9.

A description will be made of the condition under which video data can be recorded without dropout, the condition under which video data can be reproduced without interruption, and the condition under which the recording and reproduction can be performed in a time-sharing manner.

The condition under which video data can be recorded without dropout will be described first. In order that the video data 9 inputted to this apparatus can be recorded in the first portion of storing information 202 without dropout, it is necessary that the amount of data to be recorded in the second portion of storing information 202 during the time T7 be equal to or larger than that produced from the inputting information part 103 during the time T9. When the amount of data produced from the inputting information part 103 during the time T9 is larger than that recorded by the second portion of storing information 202 during the time T7, the first portion of storing information 201 overflows with the result that part of the video data is dropped out. In other words, in order to record video data without dropout, the following condition must be satisfied:

$$Rs \times T7 \geq Rv \times T9$$

where Rv [Mbps] is the bit rate of the video data produced from the inputting information part 103, and Rs [Mbps] is the effective data transfer rate of the second portion of storing information 202.

The condition under which video data can be reproduced without interruption will be described below. In order to reproduce video data without interruption in this apparatus, it is necessary that the amount of data read from the second portion of storing information 202 during the time T8 be equal to or larger than that inputted to the outputting information part 104 during the time T9. Video data is interrupted when the amount of data inputted to the outputting information part 104 during the time T9 is larger than that read from the second portion of storing information 202 during the time T8. That is, the following condition must be satisfied:

$$Rs \times T8 \geq Rv \times T9.$$

The condition under which the recording and reproduction can be made in a time-sharing manner will be described below. In order that the second portion of storing information 202 records and reproduces in a time-sharing manner, the recording and reproduction must be completed within the recording and reproduction period T9. That is, the following condition is required to satisfy:

$$T9 \geq T7+T8+2Ta$$

where Ta is the access time and takes a different value at each access, but here it is assumed to be the worst value.

Here, T7=T8, and the condition of T7 and T8 is determined by using the following specific values. Rv is 5 [Mbps], the specification of the second portion of storing information 202 meets DVD-RAM, the sequential effective data transfer rate is constant, 11 [Mbps], the recording medium is different from the reproducing medium, and Ta is 10 [s] including the medium change time. If these values are substituted for the above condition, the following condition can be obtained:

$$T7=T8 \geq 100.$$

That is, if T7 and T8 are respectively selected to be 100 [s] or above, it is possible to reproduce a recorded program while another certain program is being recorded. While here are shown the condition and method under which two video information are handled in a time-sharing manner, the number of video information to be treated may be increased, and thus such cases will not be described. In this invention, one or more video information are surely reproduced at any time. Thus, the free time-shift viewing can be realized in which the user can view a desired recorded program at any time.

FIG. 6 is a block diagram of a video information recording and reproducing apparatus of another embodiment of the invention. The apparatus of FIG. 6 corresponds to the addition of an automatic indexing information part 601 to the structure of FIG. 1. The automatic indexing information part 601 is formed of digital circuits and, if necessary, includes a microcomputer. If the microcomputer of the controlling part 101 has enough ability, the controlling part 101 may serve both as itself and as the automatic indexing part 601. The function of this automatic indexing part 601 is to automatically add indexes to the inputted video information. Indexes can be added for indication of each constant time, for detection of scene change, and for detection of a particular object by use of image recognition technique. Thus, how to add indexes may be determined by the specification of the apparatus or the like. In this invention, how to add indexes in the automatic indexing information part 601 is particularly not limited. The other constructions of the apparatus are the same as in FIG. 1, and thus will not be described here. The apparatus structure shown in FIG. 6 is capable of realizing the free time-shift viewing in which the user can view a recorded program at any time, and the intelligent searching function by simple operation.

Figure 7A:
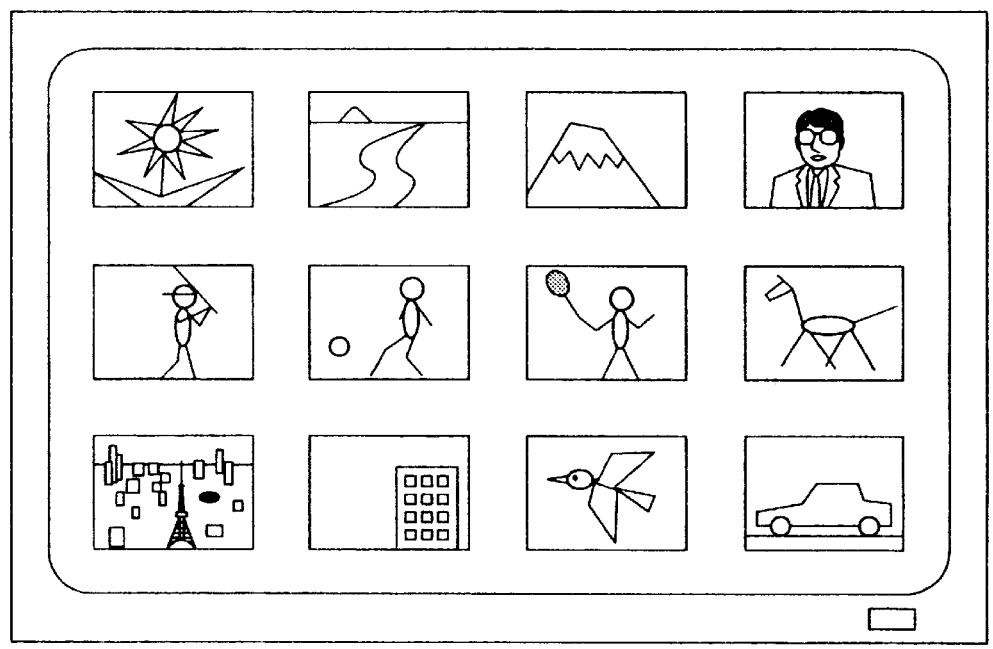
FIGS. 7A and 7B are schematic diagrams showing a intellectual search function by simple operation.
Figure 7B:
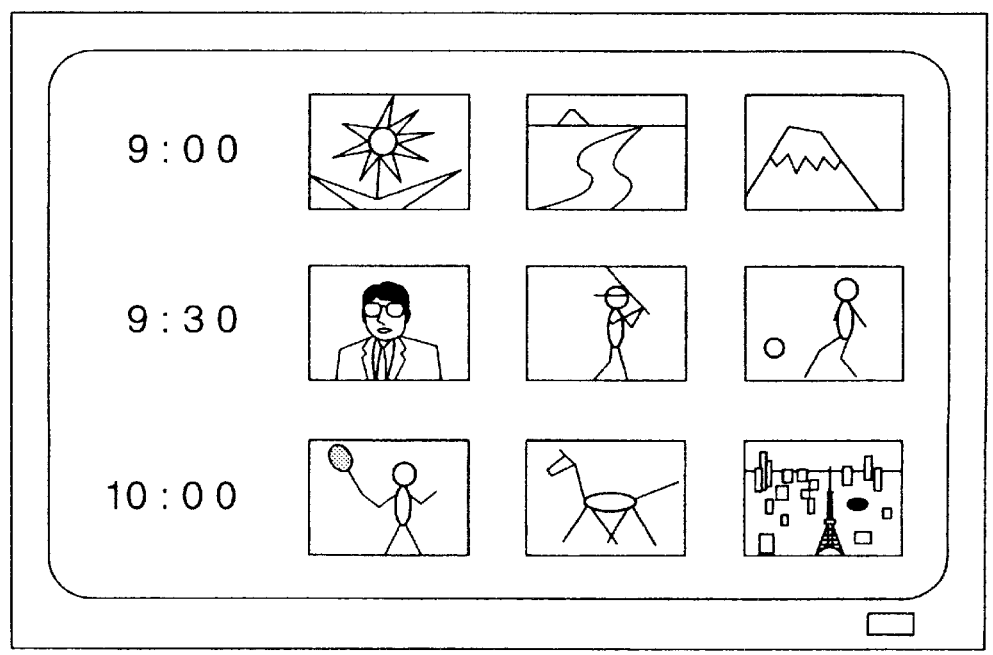

With reference to FIG. 7, the intelligent searching function according to the invention will be described which can be realized by automatically adding indexes by the automatic indexing part 601. FIG. 7A is a list of scene change cuts produced by detecting scene changes of video information by image recognition technique and adding indexes thereto in the automatic indexing part 601. The user orders the video information recording and reproducing apparatus 10 to reproduce from a desired cut, and can watch the video information. The scene changes of video information are very important for searching video information as well known so far. The user can easily find a desired scene of desired video information by referring to the list of scene change cuts. The automatic indexing part 601 not only adds an index when a scene change is detected, but also, if necessary, stores that cut in the high-speed first portion of storing information 201. Thus, the list of scene change cuts can be displayed with higher speed, making it possible to search more comfortably. FIG. 7B shows a timetable-type list of cuts which can be produced when the automatic indexing part 601 adds indexes at constant intervals of time. By referring to FIG. 7B as in FIG. 7A, the user orders the video information recording and reproducing apparatus 10 to reproduce from a desired cut, and can watch the video information. If necessary, by storing that cut in the high-speed first portion of storing information 201, it is possible to search more comfortably. Thus, according to the invention, the intelligent searching function which could not be actualized in VTR can be realized by a simple operation. While the two searching methods are shown in this embodiment, this invention is not limited thereto.

FIG. 8 is an apparatus block diagram of a video information recording and reproducing apparatus of another embodiment of the invention. The construction of FIG. 8 is equivalent to the addition of a filtering video information part 801 to the apparatus of FIG. 1. The filtering video information part 801 is formed by digital circuits of chiefly a microcomputer. If the microcomputer of the controlling part 101 has enough ability, the controlling part 101 may serve both as itself and as the filtering video information part 801. The filtering video information part 801 selects input video information according to the user's likes, and automatically stores the video information in the storing information part 102. The other construction is the same as in FIG. 1, and thus will not be described here. The structure of the apparatus shown in FIG. 8 is capable of actualizing the free time-shift viewing in which the user can view a recorded program at any time, and an automatic video data base generation function to automatically store the video information suited to the user's likes.

A description will be made of the automatic video data base generation function for automatically storing the video information suited to the user's likes, which can be actualized by the filtering video information part 801 according to the invention. First, when information of broadcasting programs cannot be obtained in advance, the filtering video information part 801 learns the channels, time zones, and frequency of the programs which the user has viewed. When this frequency has exceeded a certain reference value, the filtering video information part 801 automatically orders the inputting information part 103 and storing information part 102 to record the program of that channel and time zone even if the user does not instruct this. Therefore, it can cause the programs suited to the user's likes to be automatically stored at a considerably high probability. Then, let it be considered that information of programs can be previously obtained. The information of broadcasting programs can be previously obtained by a distributed media such as CD-ROM, electronic program guides by communications and broadcasting, and so on, which may be used in this invention. In this case, the filtering video information part 801 learns the channels, time zones, categories, and frequency of the programs which the user has viewed. When this frequency has exceeded a certain reference value, the filtering video information part 801 automatically instructs the inputting information part 103 and storing information part 102 to record the program of that channel, time zone and category even if the user does not order this. When the information of programs can be previously obtained, an unexpected program can be treated at a considerably high probability by learning the category of the programs which the user has viewed. Thus, according to the invention, it is possible to actualize an automatic video data base generation function for automatically storing video information suited to the user's likes. While this embodiment has described two methods by which the filtering video information part 801 can be actualized, the present invention is not limited thereto.

Figure 9:
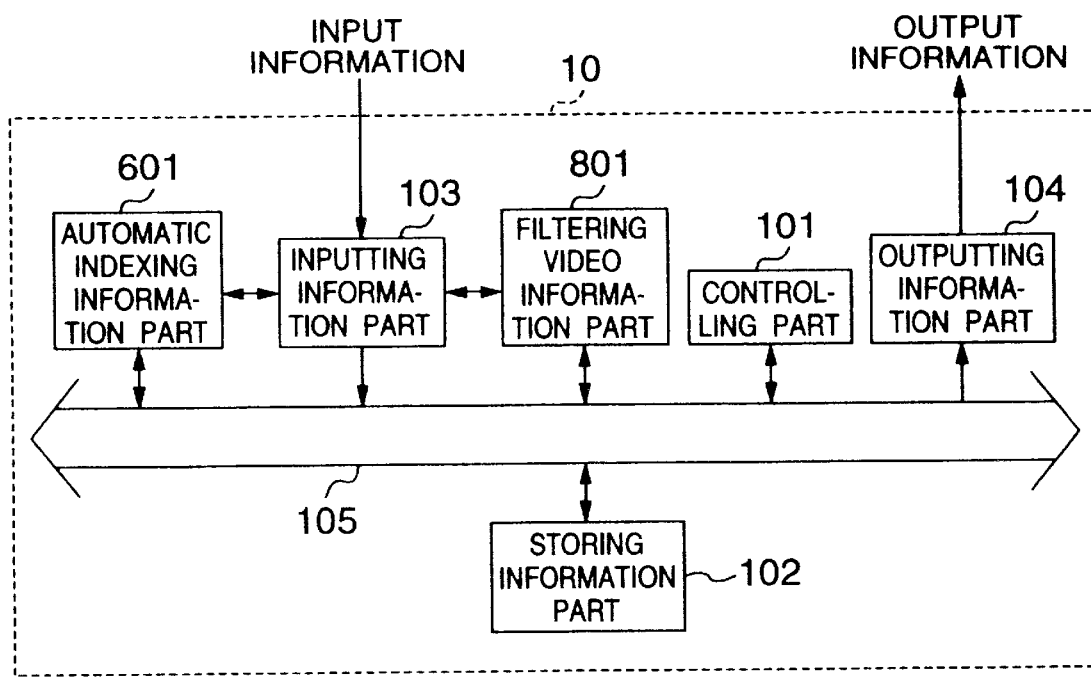
FIG. 9 is an apparatus block diagram of still another embodiment of the invention.

FIG. 9 is an apparatus block diagram of a video information recording and reproducing apparatus of still another embodiment of the invention. The construction of FIG. 9 is equivalent to the addition of the automatic indexing information part 601 and filtering video information part 801 to the apparatus of FIG. 1. The methods for realizing the apparatus construction and function have been described above, and thus will not be described here. The construction of FIG. 9 is of the greatest type which can actualize the free time-shift viewing function by which the user can view a desired recorded program at any time, the intelligent searching function by simple operation, and the automatic video data base generation function for automatically storing video information suited to the user's likes.

According to the invention, it is possible to provide a video information recording and reproducing apparatus having the free time-shift viewing function by which the user can view a desired recorded program at any time, the intelligent searching function by simple operation, and the automatic video data base generation function for automatically storing video information suited to the user's likes.

What is claimed is:

1. A video information recording and reproducing apparatus comprising:
   - an inputting information part for receiving video information;
   - a storing information part;
   - an outputting information part for producing video information;
   - a video information filtering part; and
   - a controlling part for controlling the inputting information part, the storing information part, the outputting information part, and the video information filtering part;
   - wherein the storing information part stores a plurality of video information from the inputting information part according to an instruction from the controlling part, and outputs arbitrary video information from the plurality of video information stored in the storing information part to the outputting information part; and
   - wherein the video information filtering part learns channels, time zones, and frequencies of programs which a viewer has viewed, and automatically instructs the inputting information part and the storing information part to record the programs when the frequencies have exceeded a certain reference value.

2. A video information recording and reproducing apparatus according to claim 1, wherein the storing information part includes a first means of storing information and a second means of storing information;
   - wherein an effective data transfer rate of the first means of storing information is higher than an effective data transfer rate of the second means of storing information; and
   - wherein a storage capacity of the first means of storing information is smaller than a storage capacity of the second means of storing information.

3. A video information recording and reproducing apparatus according to claim 2, wherein the second means of storing information is a reading and writing apparatus including an automatic disk changer and using hand-portable media.

4. A video information recording and reproducing apparatus according to claim 3, wherein the first means of storing information is a magnetic hard disk unit; and
   - wherein the second means of storing information is a reading and writing apparatus including an automatic disk changer and using phase-change type optical disks or magnetooptical disks.

5. A video information recording and reproducing apparatus according to claim 4, wherein the second means of storing information stores raw material information including at least video information and audio information; and
   - wherein the first means of storing information stores at least one of
   - management information for the second means of storing information, and
   - search information for information stored in the second means of storing information.

6. A video information recording and reproducing apparatus according to claim 5, wherein the first means of storing information is used as a cache for the second means of storing information.

7. A video information recording and reproducing apparatus according to claim 6, wherein the inputting information part includes:
   - at least one of a satellite TV broadcasting interface, a terrestrial TV broadcasting interface, a cable TV interface, an Internet communication channel interface, and a general-purpose digital interfaced; and
   - a video encoder including an A/D converter and a memory.

8. A video information recording and reproducing apparatus according to claim 6, wherein the outputting information part includes:
   - at least one of a video analog interface, a video digital interface, an audio analog interface, an audio digital interface, a general-purpose digital interface, and an Internet communication channel interface; and
   - a video decoder including a D/A converter and a memory.

9. A video information recording and reproducing apparatus comprising:
   - an inputting information part for receiving video information;
   - a storing information part;
   - an outputting information part for producing video information;
   - an automatic indexing information part;
   - a video information filtering part; and
   - a controlling part for controlling the inputting information part, the storing information part, the outputting information part, the automatic indexing information part, and the video information filtering part;
   - wherein the storing information part stores a plurality of video information from the inputting information part according to an instruction from the controlling part, and outputs arbitrary video information from the plurality of video information stored in the storing information part to the outputting information part; and
   - wherein the video information filtering part learns channels, time zones, and frequencies of programs which a viewer has viewed, and automatically instructs the inputting information part and the storing information part to record the programs when the frequencies have exceeded a certain reference value.

10. A video information recording and reproducing apparatus according to claim 9, wherein the storing information part includes a first means of storing information and a second means of storing information;

wherein an effective data transfer rate of the first means of storing information is higher than an effective data transfer rate of the second means of storing informational; and wherein a storage capacity of the first means of storing information is smaller than a storage capacity of the second means of storing information.

11. A video information recording and reproducing apparatus according to claim 10, wherein the second means of storing information is a reading and writing apparatus including an automatic disk changer and using hand-portable media.

12. A video information recording and reproducing apparatus according to claim 11, wherein the first means of storing information is a magnetic hard disk unity; and wherein the second means of storing information is a reading and writing apparatus including an automatic disk changer and using phase-change type optical disks or magnetooptical disks.

13. A video information recording and reproducing apparatus according to claim 12, wherein the second means of storing information stores raw material information including at least video information and audio information; and wherein the first means of storing information stores at least one of management information for the second means of storing information, and search information for information stored in the second means of storing information.

14. A video information recording and reproducing apparatus according to claim 13, wherein the first means of storing information is used as a cache for the second means of storing information.

15. A video information recording and reproducing apparatus according to claim 14, wherein the inputting information part includes:

at least one of a satellite TV broadcasting interface, a terrestrial TV broadcasting interface, a cable TV interface, an Internet communication channel interface, and a general-purpose digital interface; and a video encoder including an A/D converter and a memory.

16. A video information recording and reproducing apparatus according to claim 14, wherein the outputting information part includes:

at least one of a video analog interface, a video digital interface, an audio analog interface, an audio digital interface, a general-purpose digital interface, and an Internet communication channel interfaces; and a video decoder including a D/A converter and a memory.

* * * * *